United States Patent [19]

Fitzsimmons

[11] 4,163,232
[45] Jul. 31, 1979

[54] DUAL MODE MICROWAVE MIXER
[75] Inventor: George W. Fitzsimmons, Lynnwood, Wash.
[73] Assignee: The Boeing Company, Seattle, Wash.
[21] Appl. No.: 922,258
[22] Filed: Jul. 5, 1978
[51] Int. Cl.² .......................... G01S 9/56; H04B 7/14
[52] U.S. Cl. .................................... 343/6.8 R; 325/8; 325/11
[58] Field of Search ................. 343/6.8 R, 6.8 LC; 325/8, 11

[56] References Cited
U.S. PATENT DOCUMENTS

| | | | |
|---|---|---|---|
| 2,548,813 | 4/1951 | Perkins et al. | 343/6.8 R |
| 3,300,782 | 1/1967 | Margerum et al. | 325/8 X |
| 3,728,724 | 4/1973 | Alpers | 343/16 M X |
| 3,886,452 | 5/1975 | Seidel | 325/11 |
| 4,034,373 | 7/1977 | de Pierre | 343/7.7 |

Primary Examiner—Malcolm F. Hubler
Attorney, Agent, or Firm—Thomas H. Murray

[57] ABSTRACT

A four-port dual mode microwave mixer which operates without IF or RF switches and which provides both a passive mode of operation wherein the mixer operates as a lossy frequency translator when driven by a offset signal generator, and an active mode of operation wherein the mixer is used to convert a modulated received signal to an intermediate frequency which is mixed with the offset signal in a phase detector to detect the modulation which is used through a phase-locked loop to slave the local oscillator for retransmission of a translated signal with gain.

6 Claims, 1 Drawing Figure

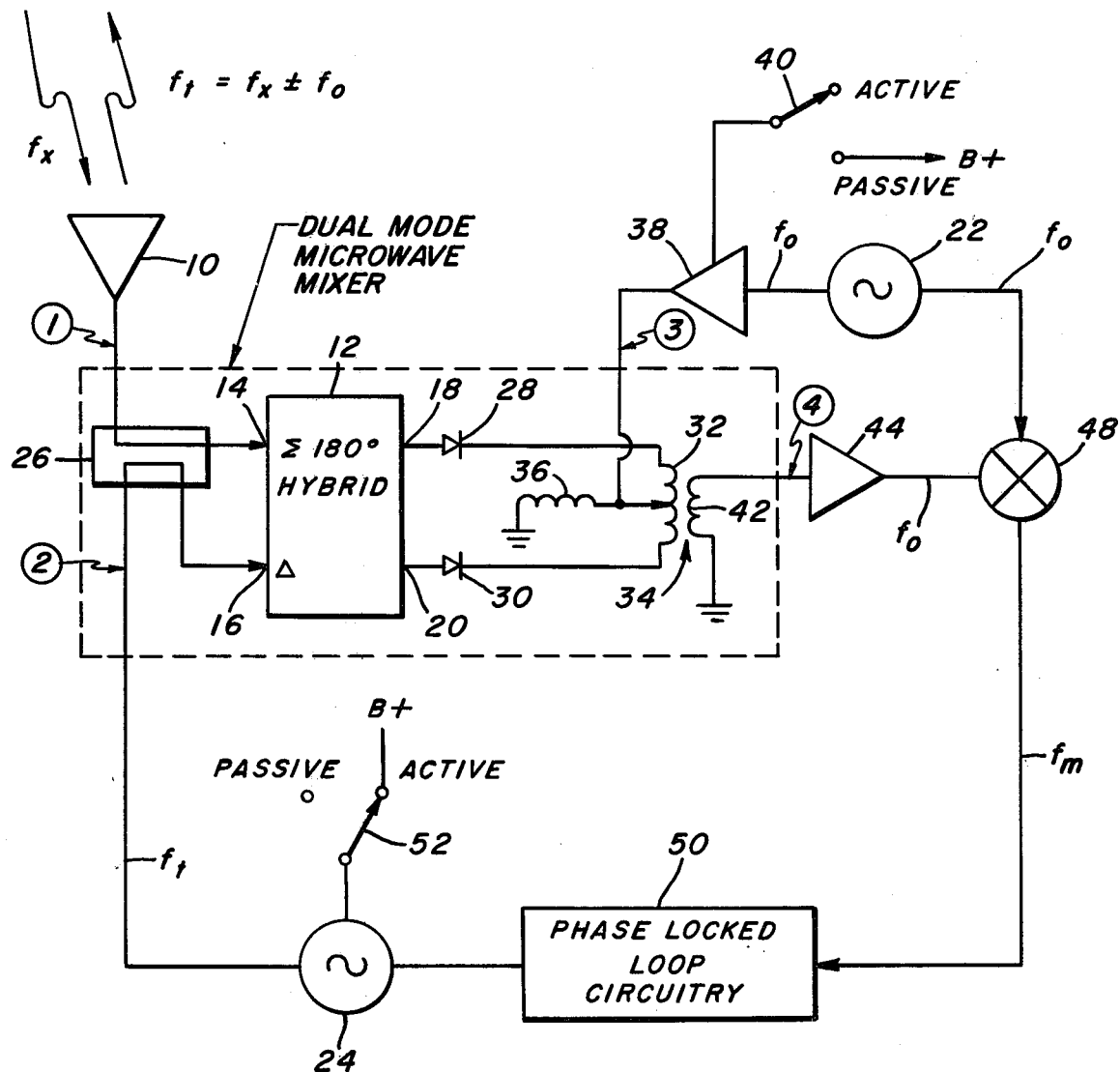

DUAL MODE MICROWAVE MIXER

BACKGROUND OF THE INVENTION

While not limited thereto, the present invention is particularly adapted for use as a dual mode transponder for a position location radar such as that used to guide an aircraft to an airborne tanker. In such a radar system, a transponder is provided on one of the aircraft which receives a signal modulated with range tones at the radar frequency from the other aircraft and transmits back a signal that is similarly modulated, but displaced in frequency with respect to the radar frequency. In the passive mode, the transponder behaves as a lossy frequency translator wherein a microwave mixer pumped by an oscillator at frequency $f_o$ generates two new signals on each side of that which is received by the frequency $f_o$. One of these is transmitted back to the other aircraft and becomes the radar received signal. In the active mode, the transponder mixer is used to convert the received radar signal to an intermediate frequency where its modulation is detected, and processed for retransmission back to the radar with a net gain through the transponder. The dual mode apparatus described requires the radar range tone modulation to be either FM or phase modulation. Hereinafter, if neither is specifically mentioned it will be assumed that the modulation is phase modulation.

A transponder of the type described above preferably utilizes a four-port dual mode mixer which will perform the passive as well as the active mixer function. In the past, four-port dual mode mixers have been provided which will perform the passive as well as the active mixer function; however they require the use of RF and IF switches which increases size and costs and degrade the mixer-IF amplifier integration for noise performance, bandwidth and conversion loss.

SUMMARY OF THE INVENTION

In accordance with the present invention, a four-port dual mode mixer is provided which will perform passive as well as active mixer functions and which avoids the use of both RF and IF switches, thereby permitting optimization of the mixer-IF amplifier integration for best noise performance, best bandwidth and lowest conversion loss. In addition, the present invention avoids the added cost and the added size associated with approaches which utilize IF and/or RF switches.

Specifically, in accordance with the invention, there is provided a 180° hybrid junction having a pair of input ports and a pair of output ports. Means are provided for applying a signal of frequency $f_x$ to one of said input ports, while first oscillator means selectively apply a signal of frequency $f_t$ to the other said input ports. Mixer diodes connect the respective output ports of the hybrid junction in-phase to the opposite ends of a transformer primary winding. To the center tap of the primary winding is applied the output of second oscillator means having a frequency $f_o$ whereby a signal of frequency $f_x \pm f_o$ will appear at the one input port of the hybrid junction for retransmission to a receiving radar, for example during passive operation. A directional coupler operatively interconnects the aforesaid input ports of the hybrid junction such that the output of the first oscillator means is coupled to the first input port for retransmission to a receiving radar under active mode conditions. The secondary winding of the aforesaid transformer is connected to an amplifier and is operable when the signal of frequency $f_t$ is applied to the other input port for mixing to derive a modulated IF signal for controlling the frequency of the first oscillator means through a phase-locked loop circuitry.

The above and other objects and features of the invention will become apparent from the following detailed description taken in connection with the accompanying single FIGURE drawing which schematically illustrates one embodiment of the invention.

With reference now to the drawing, it will be assumed that the dual mode microwave mixer of the invention is utilized as a transponder which translates a received, phase or frequency modulated signal at frequency $f_x$ to a new frequency $f_t$ which is similarly modulated and reradiates the translated signal back to a receiving radar. At close range, the transponder operates in the passive mode and consists of a simple mixer driven by an oscillator at the offset frequency $f_o$. In this mode, the transponder reradiates a signal at frequency $f_t$ which is above or below the received signal $f_x$ by an amount equal to the offset frequency $f_o$.

While the passive mode of operation described above can be utilized at close ranges, the range of the microwave sensor system will be very limited unless a second mode of operation is provided wherein the translation is accomplished with gain. In this mode, called the active mode, a time delay inherently exists. As a result, in the active mode, the delay uncertainties are too great to permit operation at short range. For these reasons, the transponder must operate in a active and passive mode. In the active mode, an aircraft can be acquired at long ranges with only modest accuracy. However, at ranges from about 1000 feet down to just a few tens of feet of range, the passive mode must be employed which has minimum delay bias range errors.

As shown in the accompanying drawing, the apparatus of the invention includes an antenna 10 adapted to receive a signal of frequency $f_x$ from a distant radar and retransmit back to the distant radar a signal of frequency $f_t$ which is equal to $f_x \pm f_o$. The four ports of the dual mode microwave mixer are labeled 1, 2, 3 and 4. The components of the mixer are a directional coupler, a 0°–180° hybrid, two or more mixer diodes and a center tapped IF transformer. The invention includes a 180° hybrid junction 12 having two input ports 14 and 16 and two output ports 18 and 20. Input port 14 is a sum port and input port 16 is a difference port. The apparatus includes an offset signal generator 22 adapted to produce an output signal having a frequency $f_o$ and a local oscillator 24 adapted to produce an output frequency $f_t$. It will be noted that the output of the oscillator 24 is coupled through directional coupler 26 to difference input port 16 as well as to the antenna 10.

The two output ports 18 and 20 are connected in-phase through mixing diodes 28 and 30 to the opposite ends of a primary winding 32 on transformer 34. The center tap of the primary winding 32 is connected to ground through inductor 36 and is also connected to the output of an amplifier 38 which is operable when, and only when, switch 40 is closed to connect the amplifier 38 to a source of B+ voltage. The input to the amplifier 38 comprises a signal at frequency $f_o$ from the offset generator 22.

One end of the secondary winding 42 of transformer 34 is grounded; while its other end is connected through an intermediate frequency amplifier 44 to a phase detector 48 where a modulated signal at frequency $f_o$ is mixed with a signal from the offset signal generator 22 at frequency $f_o$. The output of the phase detector is the modulation frequency $f_m$ which is applied through a phase-locked loop circuitry 50 to the local oscillator 24. The modulation frequency $f_m$ when applied to the local oscillator 24 modulates the local oscillator such that it produces the modulated translated frequency $f_t$ for retransmission back to the radar. The modulated local oscillator signal is coupled to the antenna 10 for transmission back to the radar by coupling through the directional coupler 26.

In the passive mode of operation, local oscillator 24 is switched OFF by switch 52 (i.e., it is disconnected from a source of B+ voltage). At the same time, switch 40 is closed such that a signal at frequency $f_o$ from offset generator 22 is applied to the center tap of primary winding 32. The offset generator 22 thus pumps each of the mixer diodes 28 and 30 in phase. The signal at frequency $f_x$ from antenna 10 is also applied to each of the mixer diodes 28 and 30 in phase. The mixing products at each diode are, therefore, in phase and those at $f_x \pm f_o$ will sum at the 180° hybrid sum input port 14 for retransmission back to a distant radar via antenna 10.

In the active mode, switch 40 is opened and switch 52 is closed to apply a B+ voltage source to the local oscillator 24. The two mixer diodes 28 and 30 receive a signal at frequency $f_x$ which is in phase and the local oscillator signal from oscillator 24 which are 180° out of phase. At the same time, the local oscillator signal at frequency $f_t$ is coupled through the directional coupler 26 to the antenna 10. Under the circumstances described, a phase modulated signal at frequency $f_o$ will appear at the output of the intermediate frequency amplifier 44. This is applied to phase detector 48 along with the signal $f_o$ from generator 22 to produce the modulation signal at frequency $f_m$ which is applied through the phase-locked loop circuitry 50 to control the output frequency of the local oscillator 24 such that its frequency is equal to $f_t$ at all times and also modulates the local oscillator 24 such that it duplicates the modulation contained on the radar signal received at frequency $f_x$.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A dual mode microwave mixer comprising a 180° hybrid junction having a pair of input ports and a pair of output ports, means for applying a signal of frequency $f_x$ to one of said input ports, first oscillator means for selectively applying a signal of frequency $f_t$ to the other of said input ports, a transformer having primary and secondary windings, mixer diodes connecting the respective output ports of said hybrid junction to the opposite ends of said primary winding, second oscillator means for selectively applying a signal of frequency $f_o$ to a center tap on said primary winding whereby a signal of frequency $f_x \pm f_o$ will appear at said one input port of the hybrid junction, a directional coupler operatively interconnecting said input ports, and means coupled to said secondary winding and operable when said signal of frequency $f_t$ is applied to said other input port for mixing the signal appearing across said secondary winding with a signal of frequency $f_o$ from said second oscillator means to derive a signal for controlling the frequency of said first oscillator means.

2. The dual mode microwave mixer of claim 1 wherein one end of said secondary winding is grounded, and including an impedance element connecting said center tap on the primary winding to ground.

3. The dual mode microwave mixer of claim 2 wherein said impedance element comprises an inductor.

4. The dual mode microwave mixer of claim 1 wherein said second oscillator means is connected to the center tap on said primary winding through an amplifier, and including means for selectively enabling or disabling said amplifier.

5. The dual mode microwave mixer of claim 4 including means for selectively disabling said first oscillator means.

6. The dual mode microwave mixer of claim 1 wherein said secondary winding is connected to a second mixer along with the output of said second oscillator means, the output of said second mixer being connected through phase-locked loop circuitry to said first oscillator means.

* * * * *